US012681228B2

(12) United States Patent
Tsai et al.

(10) Patent No.: US 12,681,228 B2
(45) Date of Patent: Jul. 14, 2026

(54) REFLECTIVE DISPLAY DEVICE

(71) Applicant: E Ink Holdings Inc., Hsinchu (TW)

(72) Inventors: Yi-Yu Tsai, Hsinchu (TW); Jau-Min Ding, Hsinchu (TW); Ching-Huan Liao, Hsinchu (TW); Chao-Chun Cheng, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 19/307,058

(22) Filed: Aug. 22, 2025

(65) Prior Publication Data

US 2026/0104543 A1      Apr. 16, 2026

Related U.S. Application Data

(60) Provisional application No. 63/707,738, filed on Oct. 15, 2024.

(51) Int. Cl.
    F21V 8/00 (2006.01)

(52) U.S. Cl.
    CPC .................................... G02B 6/004 (2013.01)

(58) Field of Classification Search
    CPC ...................................................... G02B 6/004
    See application file for complete search history.

(56) References Cited

U.S. PATENT DOCUMENTS

| | | |
|---|---|---|
| 9,322,977 B2 | 4/2016 | Kuo et al. |
| 11,106,086 B2 | 8/2021 | Chen et al. |
| 11,347,260 B2 | 5/2022 | Liao et al. |
| 11,442,299 B2 | 9/2022 | Yuan et al. |

| | | | |
|---|---|---|---|
| 12,105,379 B2 | 10/2024 | Shiau et al. | |
| 2016/0238777 A1* | 8/2016 | Chen .................... | G02B 6/0016 |
| 2021/0333826 A1* | 10/2021 | Liao ..................... | G02B 6/0068 |
| 2023/0205039 A1* | 6/2023 | Tai ....................... | G02B 6/0043 |
| | | | 362/603 |
| 2024/0045130 A1* | 2/2024 | Shao ................ | G02F 1/133626 |
| 2024/0045131 A1* | 2/2024 | Wang .................. | G02B 6/0055 |

FOREIGN PATENT DOCUMENTS

| | | |
|---|---|---|
| TW | 201903487 A | 1/2019 |
| TW | 201905566 A | 2/2019 |
| TW | M648077 U | 11/2023 |

OTHER PUBLICATIONS

The office action of corresponding TW application No. 114132184 issued on Mar. 25, 2026.

* cited by examiner

*Primary Examiner* — Evan P Dzierzynski
(74) *Attorney, Agent, or Firm* — CKC & Partners Co., LLC

(57) ABSTRACT

A reflective display device includes a reflective display panel, a cover plate on the reflective display panel, and a front light module between the reflective display panel and the cover plate. The front light module includes a light source and a light guide plate. The light guide plate includes a main body, a first microstructure, a second microstructure and a third microstructure. The main body has a first surface, a second surface and a light incident surface. The light source is disposed on the light incident surface. The first surface is between the second surface and the cover plate. The second surface is between the reflective display panel and the first surface. The first microstructure is disposed on the first surface, the second microstructure is disposed on the first microstructures and covers a portion of the first microstructure, and the third microstructure is disposed on the second surface.

20 Claims, 5 Drawing Sheets

10

200

M2
M1
LP
M3
400
100

304

S1

S2

G

IS 302
304

300

D1

D2

REFLECTIVE DISPLAY DEVICE

CROSS-REFERENCE TO RELATED APPLICATION

This application claims priority to U.S. Provisional Ser. No. 63/707,738, filed Oct. 15, 2024, which is herein incorporated by reference in its entirety.

BACKGROUND

Field of Invention

The present disclosure relates to a reflective display device. More particularly, the present disclosure relates to a display device including a light guide plate with microstructures.

Description of Related Art

Reflective display devices generally use ambient light as incident light to illuminate the reflective display panel to achieve the display function. In order to expand the range of application, a front light module is provided on the reflective display panel, and the light source is disposed on the light incident surface of the light guide plate. The light guide plate can refract the light emitted by the light source to the reflective display panel, and the reflective display panel can reflect the light to display the image. However, there is still room for improvement in the utilization efficiency and the uniformity of the light refracted from the light guide plate to the reflective display panel and the display brightness quality of the light reflected from the reflective display panel.

SUMMARY

At least one embodiment of the present disclosure provides a reflective display device that can improve light utilization efficiency, uniformity and display brightness quality.

The reflective display device according to at least one embodiment of the present disclosure includes a reflective display panel, a cover plate and a front light module. The cover plate is disposed on the reflective display panel. The front light module is disposed between the reflective display panel and the cover plate, and includes a light source and a light guide plate. The light guide plate includes a main body, a first microstructure, a second microstructure and a third microstructure. The main body has a first surface, a second surface and a light incident surface. The light source is disposed on the light incident surface, the first surface is located between the second surface and the cover plate, and the second surface is located between the reflective display panel and the first surface. The first microstructure is disposed on the first surface, the second microstructure is disposed on the first microstructure and covers a portion of the first microstructure, and the third microstructure is disposed on the second surface.

The reflective display device according to at least another embodiment of the present disclosure includes a reflective display panel, a cover plate and a front light module. The cover plate is disposed on the reflective display panel. The front light module is disposed between the reflective display panel and the cover plate, and includes a light source and a light guide plate. The light guide plate includes a main body, a first microstructure, a second microstructure and a third microstructure. The main body has a first surface, a second surface and a light incident surface. The light source is disposed on the light incident surface, the first surface is located between the second surface and the cover plate, and the second surface is located between the reflective display panel and the first surface. The first microstructure is disposed on the first surface and includes multiple protrusions, and the protrusions are evenly distributed from the light incident surface to a direction away from the light incident surface. The second microstructure is disposed on the first microstructure and covers a portion of the first microstructure, and the third microstructure is disposed on the second surface.

It is to be understood that both the foregoing general description and the following detailed description are by examples, and are intended to provide further explanation of the present disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
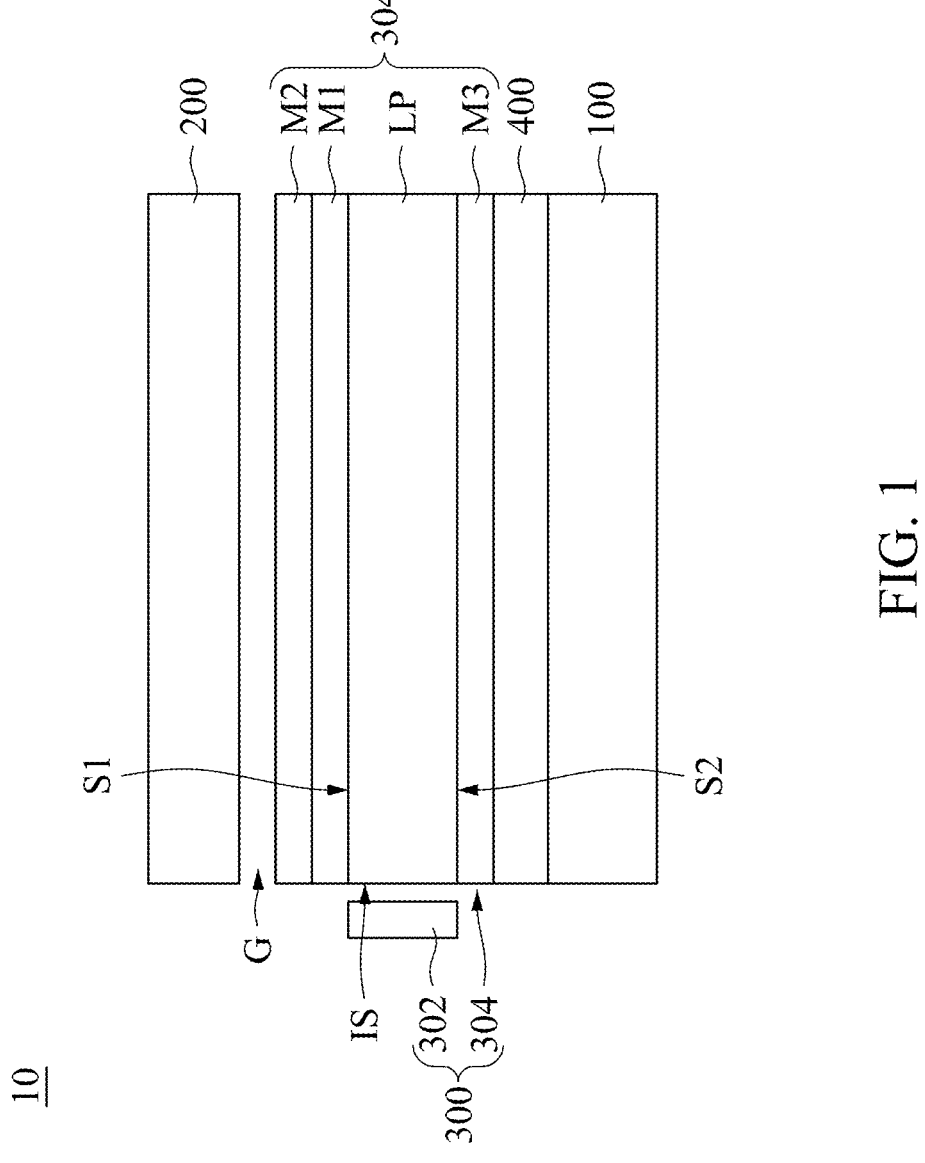
FIG. 1 is a schematic cross-sectional view of a reflective display device according to at least one embodiment of the present disclosure.

The embodiments of the present disclosure are discussed in detail below. It will be appreciated, however, that the embodiments provide many applicable concepts which may be implemented in a wide variety of specific contexts. The discussed and disclosed embodiments are for illustrative purposes only and are not intended to limit the scope of patent applications in this case.

In the following description, in order to clearly present the technical features of the present disclosure, the dimensions of elements in the drawings will be enlarged in unequal proportions. Therefore, the description and explanation of the following embodiments are not limited to the sizes and shapes presented by the elements in the drawings, but should cover the sizes, shapes, and deviations of the two due to actual manufacturing processes and/or tolerances. For example, the flat surface shown in the drawings may have rough and/or non-linear characteristics, and the acute angle shown in the drawings may be round. Therefore, the elements presented in the drawings in this case are mainly for illustration, and are not intended to accurately depict the actual shape of the elements, nor are they intended to limit the scope of patent applications in this case.

The spatial relative terms used in the present disclosure, such as "below," "under," "above," "on," and the like, are intended to facilitate the recitation of a relative relationship between one element or feature and another as depicted in the drawings. The true meaning of these spatial relative terms includes other orientations. For example, the relationship between one element and another may change from "below" and "under" to "above" and "on" when the drawing is turned 180 degrees up or down. In addition, spatially relative descriptions used in the present disclosure should be interpreted in the same manner.

It should be understood that while the present disclosure may use terms such as "first", "second", "third" to describe various elements or features, these elements or features should not be limited by these terms. These terms are primarily used to distinguish one element from another, or one feature from another. In addition, the term "or" as used in the present disclosure may include, as appropriate, any one or a combination of the listed items in association.

Moreover, the present disclosure may be implemented or applied in various other specific embodiments, and the details of the present disclosure may be combined, modified, and altered in various embodiments based on different viewpoints and applications, without departing from the idea of the present disclosure.

Figure 2A:
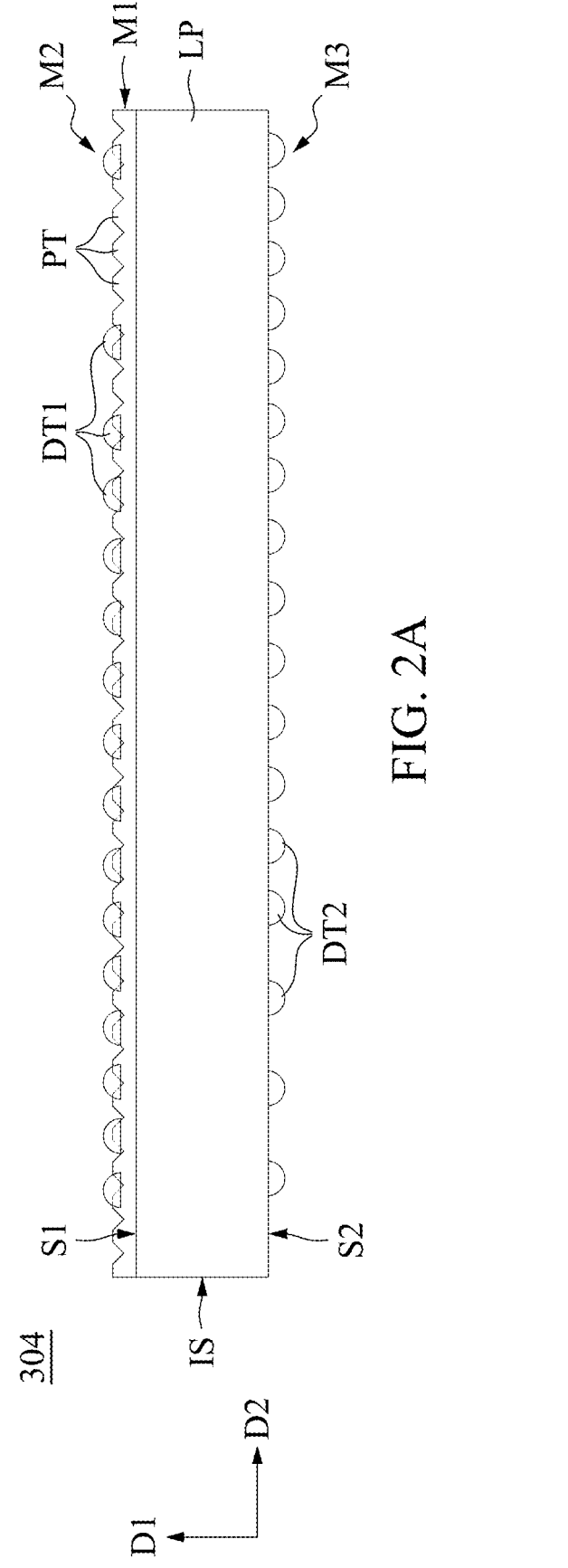
FIG. 2A is a schematic cross-sectional view of a light guide plate according to at least one embodiment of the present disclosure.

FIG. 1 is a schematic cross-sectional view of a reflective display device 10 according to at least one embodiment of the present disclosure. FIG. 2A is a schematic cross-sectional view of a light guide plate 304 according to at least one embodiment of the present disclosure. Referring to FIG. 1 and FIG. 2A, the reflective display device 10 includes a reflective display panel 100, a cover plate 200 and a front light module 300. The cover plate 200 is disposed on the reflective display panel 100. The front light module 300 is disposed between the reflective display panel 100 and the cover plate 200, and includes a light source 302 and a light guide plate 304.

The light guide plate 304 includes a main body LP, a first microstructure M1, a second microstructure M2, and a third microstructure M3. The main body LP has a first surface S1, a second surface S2, and a light incident surface IS. The light source 302 is disposed on the light incident surface IS. The first surface S1 is located between the second surface S2 and the cover plate 200. The second surface S2 is located between the reflective display panel 100 and the first surface S1. The first microstructure M1 is disposed on the first surface S1. The second microstructure M2 is disposed on the first microstructure M1 and covers a portion of the first microstructure M1. The third microstructure M3 is disposed on the second surface S2.

By disposing the first microstructure M1 at the first surface S1, disposing the second microstructure M2 on the first microstructure M1 that covers a portion of the first microstructure M1, and disposing the third microstructure M3 at the second surface S2, the utilization efficiency and the uniformity of the light refracted from the light guide plate 304 to the reflective display panel 100 and the display brightness quality of the light reflected from the reflective display panel 100 can be improved.

In detail, the first surface S1 and the second surface S2 are two surfaces opposite to each other in the normal direction (i.e., the first direction D1) of the cover plate 200. The first microstructure M1 includes multiple protrusions PT, and the protrusions PT are evenly distributed from the light incident surface IS to a direction away from the light incident surface IS (i.e., the second direction D2). A portion of the first microstructure M1 is covered by the second microstructure M2, and the other portion of the first microstructure M1 is free of being covered by the second microstructure M2. In some embodiments, the first microstructure M1 may be an anti-glare microstructure, which can improve the display brightness quality of the light reflected by the reflective display panel 100.

Referring to FIG. 1, an air gap G exists between the light guide plate 304 and the cover plate 200, the difference between the refractive index of the first microstructure M1 and the refractive index of the air gap G is not less than 0.35, and the difference between the refractive index of the second microstructure M2 and the refractive index of the air gap G is not less than 0.35. Since the second microstructure M2 is in direct contact with the air gap G, and the portion of the first microstructure M1 not covered by the second microstructure M2 is also in direct contact with the air gap G, the above-mentioned refractive index design can increase the proportion of light reflected into the reflective display panel 100, thereby improving the light utilization efficiency.

In some embodiments, the air gap G can be formed by disposing a sealant (not shown) between the light guide plate 304 and the cover plate 200, or by fastening and separating the light guide plate 304 and the cover plate 200 with an outer frame (not shown), but the present disclosure is not limited thereto.

The reflective display device 10 further includes a connection layer 400 disposed between the reflective display panel 100 and the light guide plate 304. The connection layer 400 is in direct contact with the reflective display panel 100 and the light guide plate 304 to connect to the reflective display panel 100 and the light guide plate 304.

In some embodiments, the material of the main body LP of the light guide plate 304 may be glass. With this material selection, the thermal expansion coefficient of the light guide plate 304 can be close to the thermal expansion coefficient of the glass substrate (not shown) of the reflective display panel 100, which can avoid bending and deformation due to excessive stress caused by differences in the thermal expansion coefficients, and can further enhance reliability.

The material of the connection layer 400 may be optical clear adhesive (OCA), optical clear resin (OCR) and/or other suitable materials. The cover plate 200 may be a transparent substrate, such as a glass plate or a transparent plastic plate, and the material of the transparent plastic plate may be polyethylene terephthalate (PET), polymethyl methacrylate (PMMA), polycarbonate (PC), cyclic olefin copolymer (COC) or cyclic olefin polymer (COP).

The reflective display panel 100 may be an electrophoretic display panel, an electrowetting display panel or a cholesterol liquid crystal display panel. The light source 302 may be a light bar, and the light bar includes a circuit board and multiple light emitting elements (not shown) disposed on the circuit board. In some embodiments, the light emitting element may be a light emitting diode (LED).

Referring to FIG. 2A, the second microstructure M2 includes multiple dots DT1, and the third microstructure M3 includes multiple dots DT2. The dots DT2 of the third microstructure M3 are distributed from sparse to dense from the light incident surface IS in the direction away from the light incident surface IS (i.e., the second direction D2). The refractive index of the second microstructure M2 is not greater than the refractive index of the main body LP of the light guide plate 304 and is not greater than the refractive index of the first microstructure M1. The dots DT1 of the second microstructure M2 are distributed from dense to sparse from the light incident surface IS in the direction away from the light incident surface IS (i.e., the second direction D2).

In some embodiments, the second microstructure M2 and the third microstructure M3 may be diffusion microstructures, and the uniformity of light can be improved by the above-mentioned design of refractive index and dot distribution. The first microstructure M1, the second microstructure M2, and the third microstructure M3 may be formed by processes such as dispensing, spraying, etching, screen printing, inkjet printing, UV embossing, and hot embossing. For example, the first microstructure M1 may be formed by spraying or etching, and the second microstructure M2 and the third microstructure M3 may be formed by inkjet printing, but the present disclosure is not limited thereto.

Figure 2B:
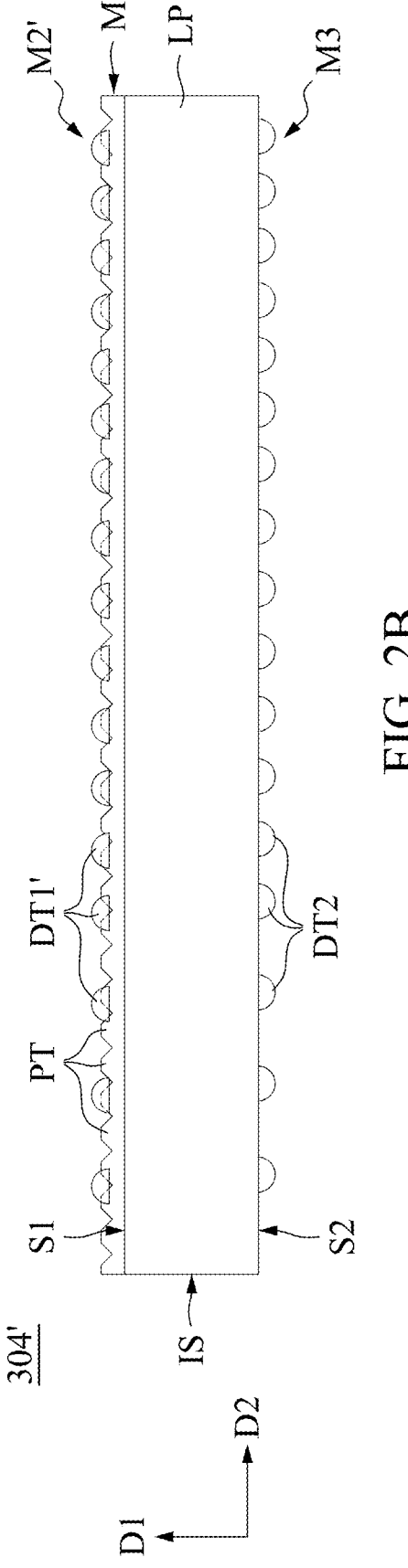
FIG. 2B is a schematic cross-sectional view of a light guide plate according to at least another embodiment of the present disclosure.

FIG. 2B is a schematic cross-sectional view of a light guide plate 304' according to at least another embodiment of the present disclosure. Referring to FIG. 2B, the structures, the materials, and the relative positions of most elements in the embodiment of FIG. 2B and the embodiment of FIG. 2A are the same, and the schematic cross-sectional view of the reflective display device of FIG. 2B is substantially the same as the schematic cross-sectional view of the reflective display device 10 of FIG. 2A, so the same features are not repeated here. The difference between the two embodiments is that the distribution of the dots DT1' of the second microstructure M2' of the light guide plate 304' in the second direction D2 is from sparse to dense.

In detail, the refractive index of the second microstructure M2' is greater than the refractive index of the main body LP of the light guide plate 304' and greater than the refractive index of the first microstructure M1. The dots DT1' of the second microstructure M2' are distributed from sparse to dense from the light incident surface IS in the direction away from the light incident surface IS (i.e., the second direction D2). The aforementioned design of refractive index and dot distribution can improve the uniformity of the light output.

Figure 3:
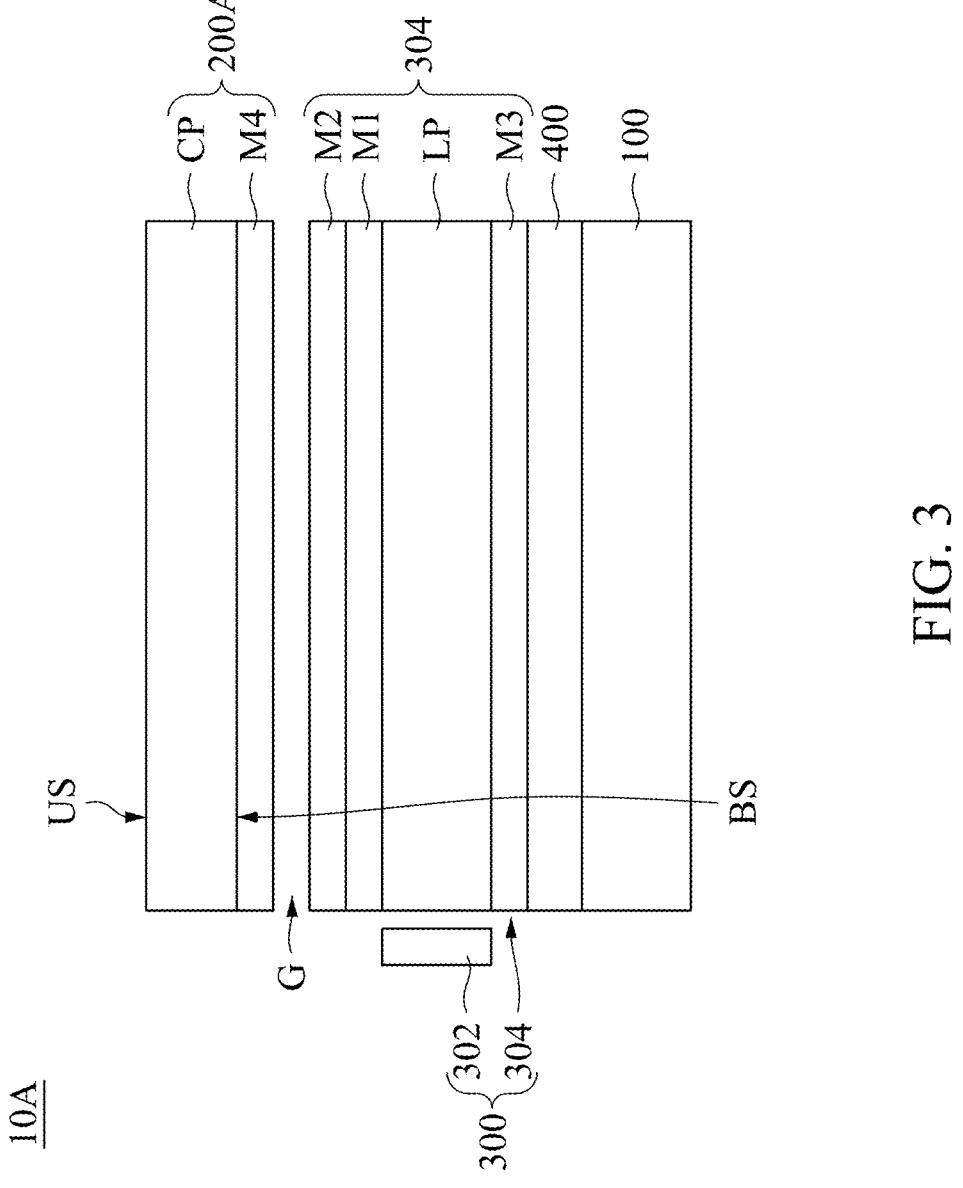
FIG. 3 is a schematic cross-sectional view of a reflective display device according to at least another embodiment of the present disclosure.
Figure 3:
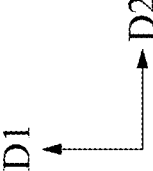

FIG. 3 is a schematic cross-sectional view of a reflective display device 10A according to at least another embodiment of the present disclosure. Referring to FIG. 3, the structures, the materials, and the relative positions of most elements in the embodiment of FIG. 3 and the embodiment of FIG. 1 are the same, so the same features are not repeated here. The difference between the two embodiments is that the cover plate 200A of the reflective display device 10A of FIG. 3 further includes a fourth microstructure M4.

In detail, the cover plate 200A of the reflective display device 10A includes a plate body CP and a fourth microstructure M4. The plate body CP has a lower surface BS facing the light guide plate 304 and an upper surface US opposite to the lower surface BS, and the fourth microstructure M4 is disposed on the lower surface BS, and an air gap G exists between the fourth microstructure M4 and the light guide plate 304.

For example, the air gap G exists between the fourth microstructure M4 and the first microstructure M1, and between the fourth microstructure M4 and the second microstructure M2. That is, the fourth microstructure M4 is in direct contact with the air gap G, the second microstructure M2 is in direct contact with the air gap G, and the portion of the first microstructure M1 not covered by the second microstructure M2 is also in direct contact with the air gap G. In some embodiments, the material and the refractive index of the fourth microstructure M4 may be the same as or different from the material and the refractive index of the plate body CP. By disposing the fourth microstructure M4, the light uniformity and the display brightness quality can be improved.

Figure 4:
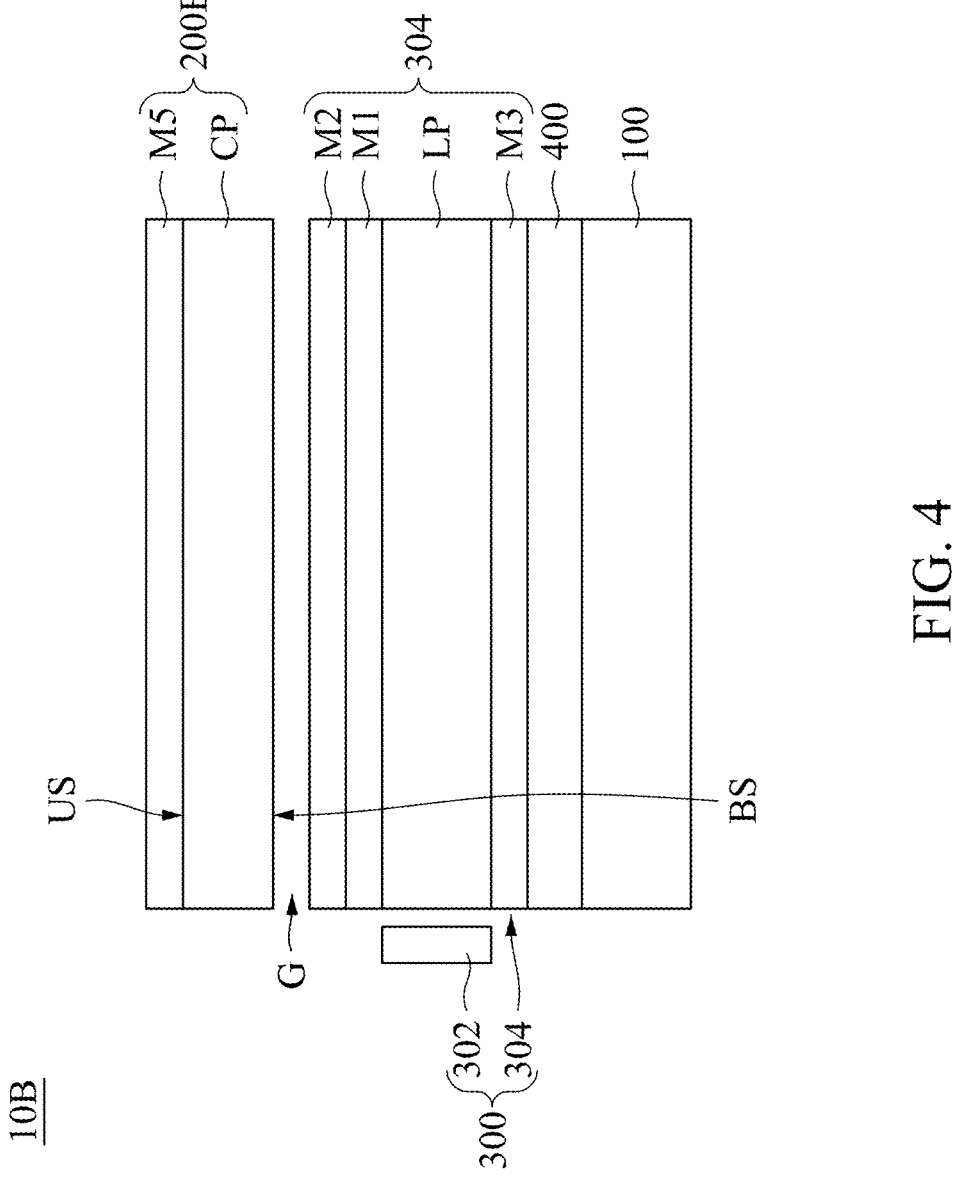
FIG. 4 is a schematic cross-sectional view of a reflective display device according to at least another embodiment of the present disclosure.
Figure 4:
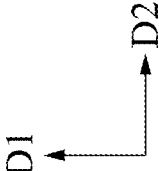

FIG. 4 is a schematic cross-sectional view of a reflective display device 10B according to at least another embodiment of the present disclosure. Referring to FIG. 4, the structures, the materials, and the relative positions of most elements in the embodiment of FIG. 4 and the embodiment of FIG. 1 are the same, so the same features are not repeated here. The difference between the two embodiments is that the cover plate 200B of the reflective display device 10B of FIG. 4 further includes a fifth microstructure M5.

In detail, the cover plate 200B of the reflective display device 10B includes a plate body CP and a fifth microstructure M5. The plate body CP has a lower surface BS facing the light guide plate 304 and an upper surface US opposite to the lower surface BS, and the fifth microstructure M5 is disposed on the upper surface US, and an air gap G exists between the lower surface BS and the light guide plate 304.

For example, the air gap G exists between the lower surface BS and the first microstructure M1, and between the lower surface BS and the second microstructure M2. That is, the lower surface BS is in direct contact with the air gap G, the second microstructure M2 is in direct contact with the air gap G, and the portion of the first microstructure M1 not covered by the second microstructure M2 is also in direct contact with the air gap G. In some embodiments, the material and the refractive index of the fifth microstructure M5 may be the same as or different from the material and the refractive index of the plate body CP. By disposing the fifth microstructure M5, the light uniformity and the display brightness quality can be improved.

Figure 5:
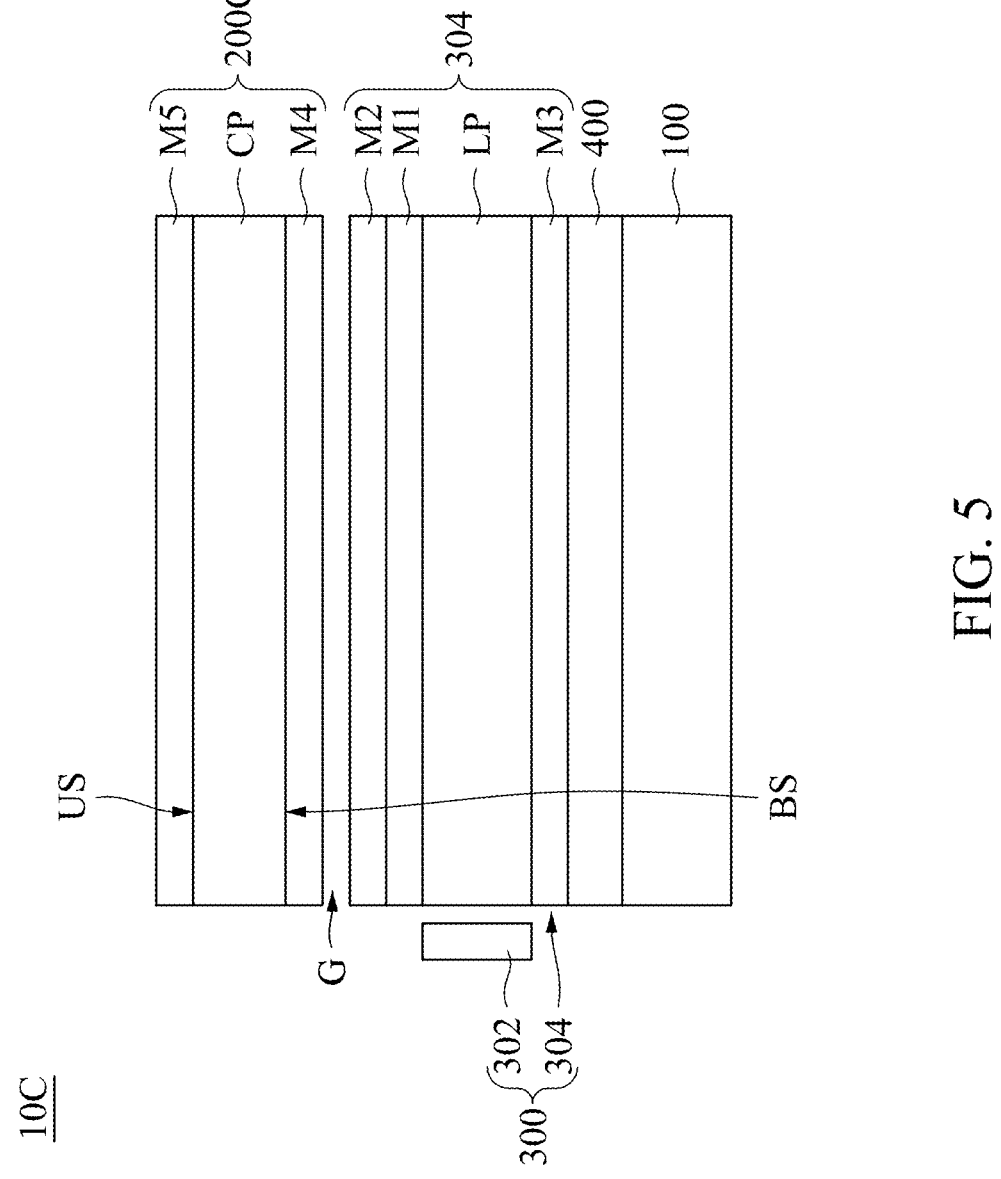
FIG. 5 is a schematic cross-sectional view of a reflective display device according to at least another embodiment of the present disclosure.

FIG. 5 is a schematic cross-sectional view of a reflective display device 10C according to at least another embodiment of the present disclosure. Referring to FIG. 5, the structures, the materials, and the relative positions of most elements in the embodiment of FIG. 5 and the embodiment of FIG. 1 are the same, so the same features are not repeated here. The difference between the two embodiments is that the cover plate 200C of the reflective display device 10C of FIG. 5 further includes a fourth microstructure M4 and a fifth microstructure M5.

In detail, the cover plate 200C of the reflective display device 10C includes a plate body CP, a fourth microstructure M4 and a fifth microstructure M5. The plate body CP has a lower surface BS facing the light guide plate 304 and an upper surface US opposite to the lower surface BS. The fourth microstructure M4 is disposed on the lower surface BS, and an air gap G exists between the fourth microstructure M4 and the light guide plate 304. The fifth microstructure M5 is disposed on the upper surface US.

For example, the air gap G exists between the fourth microstructure M4 and the first microstructure M1, and between the fourth microstructure M4 and the second microstructure M2. That is, the fourth microstructure M4 is in direct contact with the air gap G, the second microstructure M2 is in direct contact with the air gap G, and the portion of the first microstructure M1 not covered by the second microstructure M2 is also in direct contact with the air gap G. In some embodiments, the materials and the refractive indices of the fourth microstructure M4 and the fifth microstructure M5 may be the same as or different from the material and the refractive index of the plate body CP. By disposing the fourth microstructure M4 and the fifth microstructure M5, the light uniformity and the display brightness quality can be improved.

In summary, the present disclosure improves the utilization efficiency and the uniformity of light refracted from the light guide plate to the reflective display panel and the display brightness quality of the light reflected by the reflective display panel by disposing the first microstructure at the first surface of the light guide plate body, disposing the second microstructure disposed on the first microstructure that covers a portion of the first microstructure, and disposing the third microstructure at the second surface opposite to the first surface.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A reflective display device, comprising:
a reflective display panel;
a cover plate, disposed on the reflective display panel; and
a front light module, disposed between the reflective display panel and the cover plate, and comprising:
    a light source; and
    a light guide plate, comprising:
        a main body, having a first surface, a second surface and a light incident surface, wherein the light source is disposed on the light incident surface, the first surface is located between the second surface and the cover plate, and the second surface is located between the reflective display panel and the first surface;
        a first microstructure, disposed on the first surface;
        a second microstructure, disposed on the first microstructure, and covering a portion of the first microstructure; and
        a third microstructure, disposed on the second surface.

2. The reflective display device of claim 1, wherein the other portion of the first microstructure is free of being covered by the second microstructure.

3. The reflective display device of claim 1, wherein a material of the main body comprises glass.

4. The reflective display device of claim 1, wherein an air gap exists between the light guide plate and the cover plate.

5. The reflective display device of claim 4, wherein a difference between a refractive index of the first microstructure and a refractive index of the air gap is not less than 0.35.

6. The reflective display device of claim 4, wherein a difference between a refractive index of the second microstructure and a refractive index of the air gap is not less than 0.35.

7. The reflective display device of claim 4, wherein the cover plate comprises:
a plate body, having a lower surface facing the light guide plate and an upper surface opposite to the lower surface; and
a fourth microstructure, disposed on the lower surface, wherein the air gap exists between the fourth microstructure and the light guide plate.

8. The reflective display device of claim 4, wherein the cover plate comprises:

a plate body, having a lower surface facing the light guide plate and an upper surface opposite to the lower surface, wherein the air gap exists between the lower surface and the light guide plate; and
a fifth microstructure, disposed on the upper surface.

9. The reflective display device of claim 4, wherein the cover plate comprises:
a plate body, having a lower surface facing the light guide plate and an upper surface opposite to the lower surface;
a fourth microstructure, disposed on the lower surface, wherein the air gap exists between the fourth microstructure and the light guide plate; and
a fifth microstructure, disposed on the upper surface.

10. The reflective display device of claim 1, wherein the first microstructure comprises a plurality of protrusions, and the protrusions are evenly distributed from the light incident surface to a direction away from the light incident surface.

11. The reflective display device of claim 10, wherein a refractive index of the second microstructure is not greater than a refractive index of the main body and is not greater than a refractive index of the first microstructure, wherein the second microstructure comprises a plurality of dots, and the dots are distributed from dense to sparse from the light incident surface to the direction away from the light incident surface.

12. The reflective display device of claim 10, wherein a refractive index of the second microstructure is greater than a refractive index of the main body and is greater than a refractive index of the first microstructure, wherein the second microstructure comprises a plurality of dots, and the dots are distributed from sparse to dense from the light incident surface to the direction away from the light incident surface.

13. The reflective display device of claim 1, wherein the third microstructure comprises a plurality of dots, and the dots are distributed from sparse to dense from the light incident surface to a direction away from the light incident surface.

14. A reflective display device, comprising:
a reflective display panel;
a cover plate, disposed on the reflective display panel; and
a front light module, disposed between the reflective display panel and the cover plate, and comprising:
    a light source; and
    a light guide plate, comprising:
        a main body, having a first surface, a second surface and a light incident surface, wherein the light source is disposed on the light incident surface, the first surface is located between the second surface and the cover plate, and the second surface is located between the reflective display panel and the first surface;
        a first microstructure, disposed on the first surface and comprising a plurality of protrusions, wherein the protrusions are evenly distributed from the light incident surface to a direction away from the light incident surface;
        a second microstructure, disposed on the first surface, and covering a portion of the first microstructure; and
        a third microstructure, disposed on the second surface.

15. The reflective display device of claim 14, wherein a material of the main body comprises glass.

16. The reflective display device of claim 14, wherein an air gap exists between the light guide plate and the cover plate.

17. The reflective display device of claim 16, wherein a difference between a refractive index of the first microstructure and a refractive index of the air gap is not less than 0.35.

18. The reflective display device of claim 16, wherein a difference between a refractive index of the second microstructure and a refractive index of the air gap is not less than 0.35.

19. The reflective display device of claim 14, wherein a refractive index of the second microstructure is not greater than a refractive index of the main body and is not greater than a refractive index of the first microstructure, wherein the second microstructure comprises a plurality of dots, and the dots are distributed from dense to sparse from the light incident surface to the direction away from the light incident surface.

20. The reflective display device of claim 14, wherein a refractive index of the second microstructure is greater than a refractive index of the main body and is greater than a refractive index of the first microstructure, wherein the second microstructure comprises a plurality of dots, and the dots are distributed from sparse to dense from the light incident surface to the direction away from the light incident surface.

* * * * *